United States Patent [19]
DeClerck et al.

[11] Patent Number: 5,949,771
[45] Date of Patent: Sep. 7, 1999

[54] METHOD AND APPARATUS FOR PROVIDING SYNCHRONIZATION DURING HARD HANDOFF IN A COMMUNICATION SYSTEM

[75] Inventors: Daniel J. DeClerck, Algonquin; John P. Nolting, Glenview, both of Ill.

[73] Assignee: Motorola, Inc., Schaumburg, Ill.

[21] Appl. No.: 08/845,327

[22] Filed: Apr. 25, 1997

[51] Int. Cl.$^6$ .............................. H04Q 7/00; H04J 13/00
[52] U.S. Cl. .......................... 370/331; 370/335; 455/439
[58] Field of Search .................... 370/335, 331, 370/332, 333, 342, 350; 375/200; 455/436, 437, 438, 439

[56] References Cited

U.S. PATENT DOCUMENTS

| | | | |
|---|---|---|---|
| 5,200,957 | 4/1993 | Dahlin | 455/437 |
| 5,203,010 | 4/1993 | Felix et al. | 455/437 |
| 5,444,766 | 8/1995 | Farwell et al. | 455/437 |
| 5,594,718 | 1/1997 | Weaver, Jr. et al. | 455/437 |

*Primary Examiner*—Hassan Kizou
*Assistant Examiner*—Daniel Prévil
*Attorney, Agent, or Firm*—Richard A. Sonnentag

[57] ABSTRACT

At the beginning of handoff processing at a target base-station, the duplicate message detection mechanism within the layer 2 (L2) signaling layer is disabled such that the target base-station processes all received messages. When the target base-station receives and processes a Handoff Completion message, the target base-station resets all of it's duplicate detection flags to the L2 state at the start of a communication (call) except for the Handoff Completion message itself. The acknowledgment sequence number within L2 is then set to the message sequence number sent within the received Handoff Completion message. Since L2 synchronization is provided when the acknowledgment sequence number and the message sequence number are common, all acknowledgments via L2 are sent after hard handoff is completed.

10 Claims, 2 Drawing Sheets

METHOD AND APPARATUS FOR PROVIDING SYNCHRONIZATION DURING HARD HANDOFF IN A COMMUNICATION SYSTEM

FIELD OF THE INVENTION

The present invention relates generally to synchronization in communication systems, and, more particularly, to synchronization during hard handoff in communication systems.

BACKGROUND OF THE INVENTION

In code division multiple access (CDMA) communication systems compatible with IS-95, both a source and target base-station are on the same frequency during hard handoff. Since the elements comprising the signaling at the signaling layer (typically Layer 2, or L2) are disparate between source and target base-stations, the mobile station is instructed to reset it's L2 acknowledgment procedures in a Handoff Direction message sent to the mobile station by the source base-station. In this situation, there exists a time period when the target base-station may acquire the mobile station before the mobile station is instructed to handoff (via the Handoff Direction message) from the source to the target base-station. During this time period, the mobile station may send a message which would be received by the source base-station and may be received by the target base-station. Additionally, the mobile station may send a message to the target base-station before it sends a Handoff Completion message to indicate it has completed handoff.

Within the L2 signaling layer, there exists mechanisms which insure the delivery of a message to the base-station or the mobile station via message sequence numbers, acknowledgment sequence numbers, a retransmit mechanism, and a duplicate message detection mechanism. Given the above problems associated with same frequency hard handoff, i.e., inter alia, that the first message received by the target base-station may not be intended for the target base-station and that the first message sent to the target base-station by the mobile station may not be a Handoff Completion message, failures which are likely to occur include the duplicate message detection mechanisms erroneously discarding valid messages and the acknowledgment window size growing beyond four messages as specified in IS-95. An additional problem presented by the above scenario is that a base-station (source or target) can get into a state where it does not acknowledge future messages.

Thus, a need exists for an efficient method for mitigating the problems associated with the prior art.

DETAILED DESCRIPTION OF A PREFERRED EMBODIMENT

Figure 1:
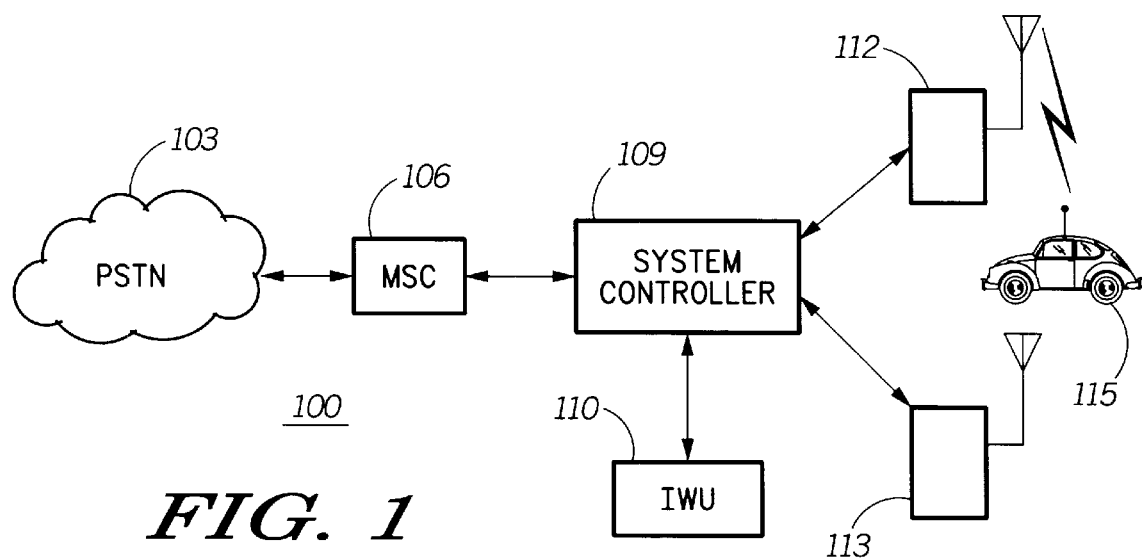
FIG. 1 generally depicts a communication system which is capable of beneficially providing L2 synchronization during transcoder switching in accordance with the invention.

Stated generally, at the beginning of handoff processing at a target base-station, the duplicate message detection mechanism within the layer 2 (L2) signaling layer is disabled such that the target base-station processes all received messages. When the target base-station receives and processes a Handoff Completion message, the target base-station resets all of it's duplicate detection flags to the L2 state at the start of a communication (call) except for the Handoff Completion message itself. The acknowledgment sequence number within L2 is then set to the message sequence number sent within the received Handoff Completion message. Since L2 synchronization is provided when the acknowledgment sequence number and the message sequence number are common, all acknowledgments via L2 are sent after hard handoff is completed.

Stated more specifically, a method of providing synchronization during hard handoff in a communication system is disclosed, where the communication system includes a source base-station and a target base-station which are each responsive to a mobile station via a communication resource. The method includes the steps of determining that a hard handoff from the source base-station to the target base-station needs to be performed and disabling, after the determination that hard handoff needs to be performed, duplicate message detection mechanisms in the target base-station such that all messages received by the target base-station are processed. The method further includes resetting parameters within the target base-station after a message representing the completion of handoff is received by the target base-station and synchronizing the target base-station and the mobile station such that acknowledgment processing between the target base-station and the mobile station occurs after the completion of hard handoff. A corresponding apparatus implements the steps described above.

In the preferred embodiment, the communication system is compatible with a code division multiple access (CDMA) cellular or personal communication system. Also, the message representing the completion of handoff further comprises a Handoff Completion message compatible with either the CDMA cellular or personal communication system. The step of synchronizing the target base-station and the mobile station further comprises the step of synchronizing a layer 2 (L2) protocol layer between the target base-station and the mobile station.

Stated even more specifically, a method of providing layer 2 (L2) synchronization during same frequency hard handoff in a communication system is disclosed, where the communication system includes a source base-station and a target base-station each responsive to a mobile station via a communication resource. The method includes the steps of determining that a same frequency hard handoff from the source base-station to the target base-station needs to be performed and disabling, after the determination that same frequency hard handoff needs to be performed, duplicate message detection mechanisms in the target base-station such that all messages received by the target base-station are sent to layer 3 (L3) for processing. The method also includes resetting parameters within the target base-station after a message representing the completion of handoff is received by the target base-station and synchronizing the target base-station and the mobile station such that acknowledgment processing between the target base-station and the mobile station occurs after the completion of same frequency hard handoff.

FIG. 1 generally depicts a communication system 100 which beneficially implements L2 synchronization in accordance with the invention. In the embodiment depicted in FIG. 1, the communication system 100 is implemented utilizing a code-division multiple access (CDMA) radiotelephone system which is compatible with Interim Standard (IS) 95-B. For more information on IS-95-B, see TIA/EIA/IS-95-B, *Mobile Station-Base Station Compatibility Standard for Dual Mode Wideband Spread Spectrum Cellular System*, March 1995. In an alternate embodiment, the CDMA radiotelephone system 100 could also be compatible with ANSI J-STD-008, *Personal Station-Base Station Compatibility Requirements for 1.8 to 2.0 GHz Code Division Multiple Access (CDMA) Personal Communication Systems*, August 1995. As one of ordinary skill in the art will appreciate, various other types of communication systems which suffer from lack/loss of L2 synchronization during transcoder switching may beneficially employ the present invention. For example, one other type of system which suffers from lack of L2 synchronization during transcoder switching is a time-division multiple access (TDMA) communication system.

As shown in FIG. 1, a public switched telephone network 103 (PSTN) is coupled to a mobile switching center 106 (MSC). As is well known in the art, the PSTN 103 provides wireline switching capability while the MSC 106 provides switching capability related to the CDMA radiotelephone portion of the system 100. Also coupled to the MSC 106 is a system controller 109 which includes the apparatus and method for synchronizing during transcoder switching in accordance with the invention. Coupled to the system controller 109 is an Interworking Unit (IWU) 110 which handles data communications to/from the mobile station 115 within the communication system 100.

While the switching capability of the MSC 106, the control capability of the controller 109 and the data handling capability of the IWU are shown as distributed in FIG. 1, one of ordinary skill in the art will appreciate that the various functions could be combined in a common physical entity for system implementation.

The controller 109 also controls the routing of signals to/from base-stations 112–113, where the base-stations 112–113 are responsible for communicating with a mobile station 115. As shown in FIG. 1, the base-station 112 is in communication with the mobile station 115, and is thus considered (for handoff purposes) the source base-station. Since base-station 113 is not currently in communication with the mobile station 115 but is available to accept the mobile station 115 during handoff, the base-station 113 is considered a target base-station. In the context of FIG. 1, the infrastructure equipment is generally comprised of the system controller 109, the base-stations 112–113 and the IWU 110.

Figure 2:
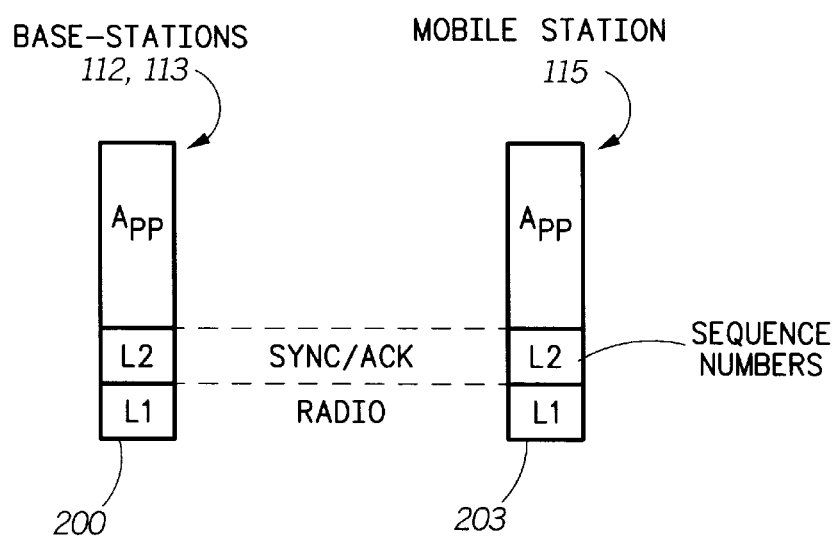
FIG. 2 generally depicts signaling layers implemented between base-stations and mobile stations within the communication system of FIG. 1.

FIG. 2 generally depicts signaling layers implemented between base-stations 112–113 and the mobile station 115 within the communication system 100. As shown in FIG. 2, the signaling layers 200 and 203 corresponding to the base-stations 112–113 and the mobile station 115, respectively, are essentially identical. Using the signaling layer depiction 200 as an example, the first layer (L1) is typically dedicated for air-interface signaling dedicated to the radio link. In other words, all messaging associated with the radio link occurs at L1. The second layer shown in signaling stack 200 is that of layer 2 (L2). Within L2, signaling related to L2 synchronization and acknowledgment between the base-stations 112–113 and the mobile station 115 is performed. In the preferred embodiment, when transcoder switching occurs, it is this layer which loses the L2 synchronization between the infrastructure equipment and the mobile station 115. The layer L2 includes sequence numbers which help keep track of L2 synchronization during the associated signaling for synchronization. Shown above L2 in the signaling stack 200 is an applications layer, which generally provides signaling related to the type of applications supported by the base-stations 112–113 and the mobile station 115.

Figure 3:
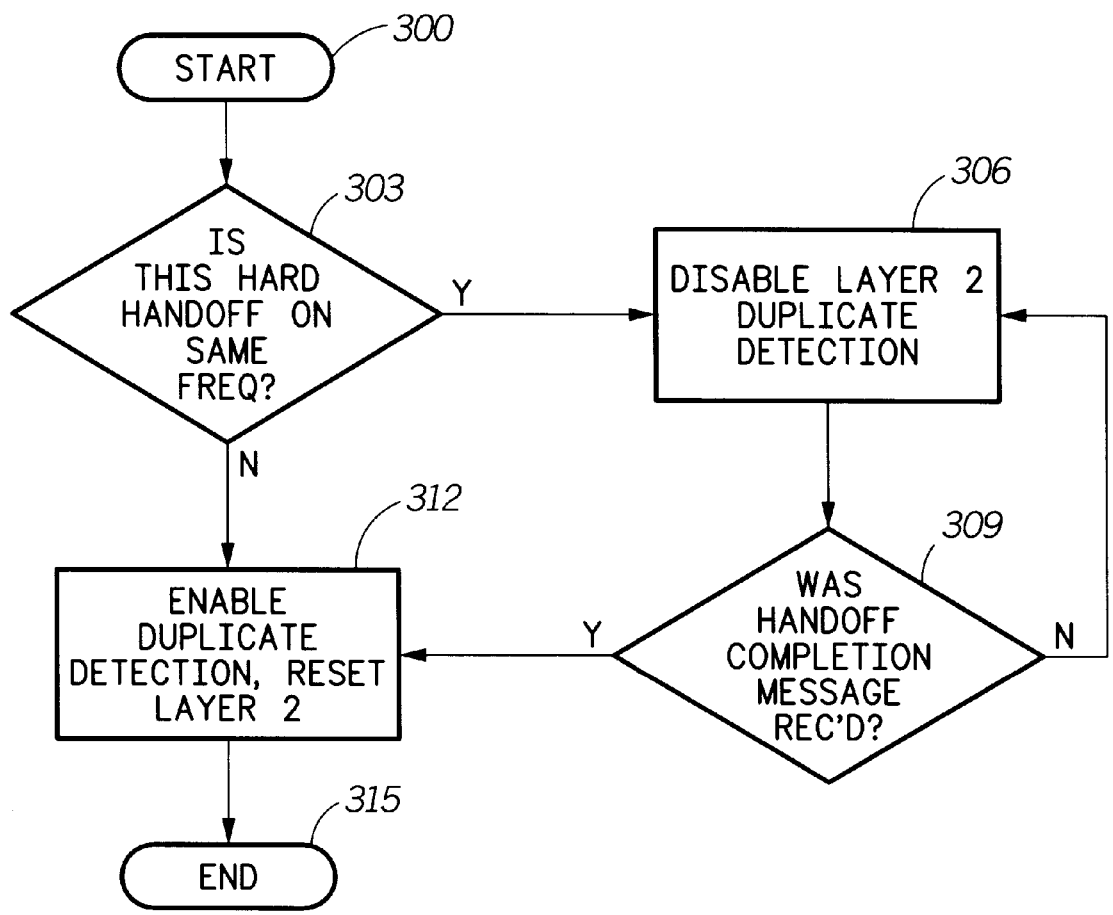
FIG. 3 generally depicts a flow diagram of synchronization during hard handoff in accordance with the invention.

FIG. 3 generally depicts a flow diagram of synchronization during same frequency hard handoff in accordance with the invention. Referring to FIG. 3, the process starts at step 300 and proceeds to step 303 where a test is performed to determine whether a hard handoff on the same frequency needs to be performed. If the test is negative, flow proceeds to block 312 where the duplicate message detection mechanism is enabled and L2 is reset. However, if the test is positive, flow proceeds to block 306 where duplicate L2 duplicate message detection mechanism in accordance with the invention. By disabling the L2 duplicate message detection mechanism, all messages received at L2 are sent to layer 3 (L3) such that no messages, including valid messages, are discarded in accordance with the invention. The L2 duplicate message detection mechanism is left disabled until a positive result of a test at step 309 is performed to determine whether a Handoff Completion message is received. After the Handoff Completion message is received, the process flows to step 312 where the duplicate message detection mechanism is enabled, L2 is reset and the process ends at 315. At this point, the L2 is synchronized during hard handoff in accordance with the invention.

While the invention has been particularly shown and described with reference to a particular embodiment, it will be understood by those skilled in the art that various changes in form and details may be made therein without departing from the spirit and scope of the invention. The corresponding structures, materials, acts and equivalents of all means or step plus function elements in the claims below are intended to include any structure, material, or acts for performing the functions in combination with other claimed elements as specifically claimed.

What we claim is:

1. A method of providing synchronization during hard handoff in a communication system, the communication system including a source base-station and a target base-station each responsive to a mobile station via a communication resource, the method comprising the steps of:

determining that a hard handoff from the source base-station to the target base-station needs to be performed;

disabling, after the determination that hard handoff needs to be performed, duplicate message detection mechanisms in the target base-station such that all messages received by the target base-station are processed;

resetting parameters within the target base-station after a message representing the completion of handoff is received by the target base-station; and synchronizing the target base-station and the mobile station such that acknowledgment processing between the target base-station and the mobile station occurs after the completion of hard handoff.

2. The method of claim 1, wherein the communication system is compatible with a code division multiple access (CDMA) cellular or personal communication system.

3. The method of claim 2, wherein the message representing the completion of handoff further comprises a Handoff Completion message compatible with either the CDMA cellular or personal communication system.

4. The method of claim 1, wherein the step of synchronizing the target base-station and the mobile station further comprises the step of synchronizing a layer 2 (L2) protocol layer between the target base-station and the mobile station.

5. An apparatus for providing synchronization during hard handoff in a communication system, the communication system including a source base-station and a target base-station each responsive to a mobile station via a communication resource, the apparatus comprising:

means for determining that a hard handoff from the source base-station to the target base-station needs to be performed;

means, after the determination that hard handoff needs to be performed, for disabling duplicate message detection mechanisms in the target base-station such that all messages received by the target base-station are processed;

means for resetting parameters within the target base-station after a message representing the completion of handoff is received by the target base-station; and means for synchronizing the target base-station and the mobile station such that acknowledgment processing between the target base-station and the mobile station occurs after the completion of hard handoff.

6. The apparatus of claim 5, wherein the communication system is compatible with a code division multiple access (CDMA) cellular or personal communication system.

7. The apparatus of claim 6, wherein the message representing the completion of handoff further comprises a Handoff Completion message compatible with either the CDMA cellular or personal communication system.

8. The apparatus of claim 5, wherein the means for synchronizing the target base-station and the mobile station further comprises means for synchronizing a layer 2 (L2) protocol layer between the target base-station and the mobile station.

9. A method of providing layer 2 (L2) synchronization during same frequency hard handoff in a communication system, the communication system including a source base-station and a target base-station each responsive to a mobile station via a communication resource, the method comprising the steps of:

determining that a same frequency hard handoff from the source base-station to the target base-station needs to be performed;

disabling, after the determination that same frequency hard handoff needs to be performed, duplicate message detection mechanisms in the target base-station such that all messages received by the target base-station are sent to layer 3 (L3) for processing;

resetting parameters within the target base-station after a message representing the completion of handoff is received by the target base-station; and synchronizing the target base-station and the mobile station such that acknowledgment processing between the target base-station and the mobile station occurs after the completion of same frequency hard handoff.

10. The method of claim 9, wherein the communication system is compatible with a code division multiple access (CDMA) cellular or personal communication system.

* * * * *